United States Patent [19]
Larkin et al.

[11] 3,909,492
[45] Sept. 30, 1975

[54] STABILIZATION OF VINYL CHLORIDE POLYMERS WITH MIXTURES OF ORGANOTIN MERCAPTIDES AND MERCAPTOESTERS

[75] Inventors: William A. Larkin, Morristown; Robert C. Ringwood, Jr., Sewaren, both of N.J.

[73] Assignee: M & T Chemicals Inc., Greenwich, Conn.

[22] Filed: Nov. 22, 1974

[21] Appl. No.: 526,321

Related U.S. Application Data

[63] Continuation-in-part of Ser. No. 137,624, April 26, 1971, abandoned, which is a continuation-in-part of Ser. No. 709,890, March 4, 1968, abandoned.

[52] U.S. Cl. ........................... 260/45.75 S; 252/406
[51] Int. Cl.² ......................................... C08G 6/00
[58] Field of Search ............... 260/45.75 S; 252/406

[56] References Cited
UNITED STATES PATENTS

| 3,640,947 | 2/1972 | Gloskey | 260/45.75 |
| 3,810,868 | 5/1974 | Weisfeld et al. | 260/45.75 |
| 3,855,179 | 12/1974 | Wilkins et al. | 260/45.75 |
| 3,887,519 | 6/1975 | Weisfeld et al. | 260/45.75 |

*Primary Examiner*—V. P. Hoke
*Attorney, Agent, or Firm*—Robert P. Auber; Kenneth G. Wheeless; Robert Spector

[57] ABSTRACT

Vinyl chloride polymers are stabilized against the deteriorative effect of heat using a primary stabilizer selected from the group consisting of butyltin-S,S', S''-tris(isooctylmercaptoacetate) and butyltin tris(lauryl mercaptide); and an auxiliary stabilizer selected from the group consisting of tributyltin-S-isooctylmercaptoacetate, triphenyltin lauryl mercaptide and triphenyltin thiophenate.

5 Claims, No Drawings

STABILIZATION OF VINYL CHLORIDE POLYMERS WITH MIXTURES OF ORGANOTIN MERCAPTIDES AND MERCAPTOESTERS

BACKGROUND

This application is a continuation-in-part of application Ser. No. 137,624, filed Apr. 26, 1971, now abandoned which in turn is a continuation-in-part of application Ser. No. 709,890, filed Mar. 4, 1968 and now abandoned.

This invention relates to a method for stabilizing halogen-containing polymers, including poly(vinyl chloride), and to novel stabilized halogen-containing polymer compositions.

As is well-known to those skilled in the art, various halogen-containing organic polymers, particularly vinyl halide polymers which include homopolymers of vinyl chloride and copolymers of vinyl chloride with other monomers, often degrade when subjected to heat over an extended period of time, as evidenced by darkening of the resin and by an increase in brittleness. These defects may render the resin unsuitable for many uses since the darkening produces an unsightly appearance, and the increased brittleness may cause mechanical failures. A wide variety of materials have heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including polyvinyl chloride during the period when the resins and stabilizer composition may be mantained on the hot mill or in the extruder employed to blend these materials. During this period, which may be from 5 to 30 minutes or longer, the various ingredients including, e.g. pigment, plasticizer, stabilizer, lubricant, etc. are mixed with the resin and the mixture subjected to heat and pressure. During this period of severe heating (typically at 175°C. or higher), the resin may deteriorate much more quickly than under normal processing or handling conditions. Thus, the product coming from the Banbury Mill-Blender or extruder may be darker than is desirable.

Those skilled-in-the-art have heretofore attempted to eliminate this deterioration resulting from heat by addition of various materials including auxiliary heat stabilizers. It has been found, however, that the presence of these additional materials results in undesirable sideeffects which may unsatisfactorily modify the desired properties of the resin or polymer. Accordingly, it has heretofore not been possible to prepare resin compositions which may be stabilized in totally satisfactory manner against the deteriorative effect of heat.

It is therefore an objective of this invention to provide a method for stabilizing certain halogen-containing resins, including polyvinyl chloride and copolymers of vinyl chloride, against the decomposition and resultant discoloration reduced by heating.

U.S. Pat. No. 2,641,588, issued to W. E. Leistner and O. H. Knoepke, teaches the usefulness of organotin derivatives of mercaptoesters containing one, two or three hydrocarbon radicals bonded to the tin atom. U.S. Pat. No. 2,726,227, issued to the same patentees, discloses that one can employ mixtures of organotin mercaptoesters to stabilize vinyl chloride polymers. From mixtures of two stabilizers one would espect an additive effect, in that if one of the components is a superior heat stabilizer relative to the other component or components, the resultant heat stability should be somewhat less than the stability imparted by a concentration of superior stabilizer equal to that of the mixture. In other words, by replacing a portion of a superior stabilizer with a less efficacious one, the heat stability imparted by this mixture should be no better than the stability imparted by an equal weight of the superior stabilizer alone.

Surprisingly it has now been found that certain combinations of mono- and triorganotin compounds do not conform to the properties expected from mixtures containing two stabilizers of considerably different efficacies, in that the resultant heat stability is superior to that attained using the more efficacious stabilizer alone.

SUMMARY OF THE INVENTION

In accordance with one of its aspects, this invention provides improved stabilizer compositions comprising a primary stabilizer selected from the group consisting of butyltin tris(isooctylmercaptoacetate), n-octyltin tris(iso-octylmercaptoacetate) and butyltin tris(lauryl mercaptide); and an auxiliary stabilizer selected from the group consisting of tributyltin isooctylmercaptoacetate, triphenyltin lauryl mercaptide and triphenyltin thiophenate. The weight ratio of primary to auxiliary stabilizer is between 1:2 and 7:1.

A second aspect of this invention provides halogen-containing resin compositions that incorporate effective amounts of the aforementioned primary and auxiliary stabilizers. The resin compositions exhibit a resistance to heat-induced degradation that is surprisingly high relative to the performance of the individual components of the stabilizer composition.

DETAILED DESCRIPTION OF THE INVENTION

The polymers or resins which may be stabilized by practice of this invention are halogen-containing organic polymers, typically those which contain chlorine atoms bonded to the polymer chain. These polymers may be homopolymers including polyvinyl chloride-type polymers, e.g. polyvinyl chloride, polyvinylidene chloride, etc. There may also include copolymers formed by the copolymerization of vinyl chloride or vinylidene chloride with other ethylenically unsaturated monomers. Ethylenically unsaturated monomers include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to vinyl chloride polymers.

The polymers may be either "rigid" or "flexible". When "rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc. in addition to the resin and stabilizer.

The vinyl chloride polymers may also contain plasticizers such as dioctyl phthalate; lubricating agents such as stearic acid; pigments; fillers, etc.

The primary stabilizer of the present compositions is either butyltin-S,S',S''-tris-(iso-octylmercaptoacetate) or butyltin tris-(lauryl mercaptide). The auxiliary stabilizers of this invention include tributyltin-S-isooctyl mercaptoacetate, triphenyltin thiophenate and triphenyltin lauryl mercaptide.

A characteristic feature of the present stabilizer composition is that the combination of primary and auxiliary stabilizer imparts significantly greater heat stability to the resin than an equal weight of the primary stabilizer alone, yet the auxiliary stabilizer is substantially less effective than the primary stabilizer in preventing heat induced degradation when employed as the sole stabilizer component in amounts up to two parts by weight per 100 parts of resin.

The primary and auxiliary stabilizers are present in stabilizing amounts. Typically the primary and auxiliary stabilizers may be used in amounts from 0.1 – 10 parts by weight of halogen-containing, typically vinyl chloride resins. Preferably they are used in the amount of 0.25 – 1.75 parts per 100 parts of halogen-containing resin.

The weight ratio of primary to auxiliary stabilizer should preferably be between 1:2 and 7:1.

The stabilizer compositions of this invention may be blended into the resin using conventional techniques such as milling, dry blending or Banbury blending. A convenient formulating method involves the formation of a stabilizer composition containing the primary and auxiliary stabilizers in addition to antioxidants, lubricants, and other processing aids. This composition is subsequently blended into the vinyl chloride polymer.

Because of the outstanding properties of this novel stabilizer system, it is possible to effect stabilization more efficiently, on a cost-performance basis, than is possible using prior art stabilizers.

The following examples demonstrate the unexpected and outstanding stabilization attained by practice of this invention. All parts are by weight unless otherwise indicated.

In these examples, the rigid vinyl chloride polymer employed was that having a specific gravity of 1.40, a Shore Durometer D hardness of 80 and an ultimate tensile strength of about 7,000 psi, sold under the trademark Geon 103 EP, (or an equivalent thereof).

The resin compositions were prepared by placing the polyvinyl chloride composition together with the desired quantities of primary and auxiliary stabilizer on a two-roller differential speed mill which was oil-heated to a temperature of 163°C. The mixture was milled for about 5 minutes, during which time a continuous band of the composition formed around one of the rollers. This band was cut and the composition removed from the hot roller as a continuous sheet. Squares of this material measuring 2.54 × 2.54 cm were cut for heat stability testing.

For the heat stability test, the squares were placed in an air oven regulated to maintain a temperature of 190°C. Samples of each composition were removed from the oven at 5 or 15 minute intervals and rated visually as to color change and degradation using the Gardner color scale wherein a rating of zero signifies a colorless sample and a rating of 20 corresponds to black.

Table I summarizes the reslts using (a) the two-component stabilizers of this invention, (b) the primary stabilizer alone, (c) the auxiliary stabilizer alone, and (d) stabilizer compositions suggested by the prior art but which are outside the scope of the present invention.

TABLE I

| Sample No. | Stabilizer (Parts) | Gardner Color Following X Minutes of Heating at 190°C | | | | |
|---|---|---|---|---|---|---|
| | | X=0 | 15 | 30 | 45 | 60 |
| 1 | None | 2 | 12 | 17 | 19 | 19 |
| 2 | BuSn(IOMA)$_3$ (2.0) | 0 | 1 | 1 | 3 | 17 |
| 3 | BuSn(SC$_{12}$H$_{25}$)$_3$ (2.0) | 0 | 2 | 3 | 3 | 3 |
| 4 | Bu$_3$SnIOMA (2.0) | 3 | 6 | 10 | 10 | 13 |
| 5 | BuSn(SC$_{12}$H$_{25}$)$_3$ (1.0)<br>Bu$_3$SnIOMA (1.0) | 0 | 0 | 1 | 2 | 5 |
| 6 | BuSn(SC$_{12}$H$_{25}$)$_3$ (1.75)<br>Bu$_3$SnIOMA (0.25) | 0 | 0 | 1 | 2 | 5 |
| 7 | BuSn(SC$_{12}$H$_{25}$)$_3$ (0.75)<br>Bu$_3$SnIOMA (1.25) | 0 | 0 | 1 | 2 | 5 |
| 8 | φ$_3$Sn(SC$_{12}$H$_{25}$) (2.0) | 4 | 9 | 10 | 8 | 8 |
| 9 | BuSn(SC$_{12}$H$_{25}$)$_3$ (1.5)<br>φ$_3$Sn(SC$_{12}$H$_{25}$) (.05) | 3 | 3 | 4 | 5 | 6 |
| 10 | φ$_3$SnS–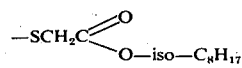 (2.0) | 4 | 5 | 6 | 7 | 7 |
| 11 | BuSn(IOMA) (1.5)<br>φ$_3$SnS–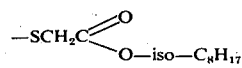 (0.5) | 0 | 0 | 1 | 2 | 3 |

Bu = n-butyl
φ = phenyl = C$_6$H$_5$—

IOMA = isooctyl mercaptoacetate —SCH$_2$C(=O)(O—iso—C$_8$H$_{17}$)

It is evident from the data in Table I that the monobutyltin-S,S',S''-tris(isooctyl mercaptoacetate) imparts satisfactory heat stability to vinyl chloride polymers. The corresponding tributyltin compounds and two triphenyltin compounds are considerably less efficacious than butyltin-S,S',S''-tris(isooctyl mercaptoacetate) with regard to both initial color of the milled sheet and long term heat stability. If a portion of the monoorganotin compound is a polyvinyl chloride formulation is replaced with a less efficacious triorganotin compound, one would reasonably expect the overall heat stability to decrease to a level between that obtained using the pure monobutyltin derivative and the triorganotin compound. This is particularly true for the stability following 15 minutes or more of heating.

Although butyltin tris(lauryl mercaptide) is not nearly so efficacious as the corresponding mercaptoacetic acid esters, the stability imparted to vinyl chloride polymers by this compound is enhanced when a portion of the compound is replaced by one of the present triorganotin compounds.

The data in Table II demonstrate that the significant improvement in heat stability, particularly long term heat stability, that characterizes the present two-component stabilizers is not observed when the monoorganotin compound is replaced by the corresponding diorganotin derivative. The polymer samples were milled and tested for heat stability as described hereinbefore.

TABLE II

| Sample No. | Stabilizer (Parts) | Gardner Color Following X Minutes of Heating at at 190°C. | | | |
|---|---|---|---|---|---|
| | | X=0 | 15 | 30 | 45 |
| 1 | BuSn(SC$_{12}$H$_{25}$)$_3$ (2.0) | 0 | 2 | 3 | 3 |
| 2 | Bu$_2$Sn(SC$_{12}$H$_{25}$)$_2$ (2.0) | 1 | 3 | 4 | 4 |
| 3 | Bu$_3$Sn(IOMA) (2.0) | 3 | 6 | 10 | 10 |
| 4 | BuSn(SC$_{12}$H$_{25}$)$_3$ (0.75) Bu$_3$SnIOMA (1.25) | 0 | 0 | 1 | 2 |
| 5 | Bu$_2$Sn(SC$_{12}$H$_{25}$)$_2$ (0.5) Bu$_3$SnIOMA (1.5) | 1 | 5 | 7 | 7 |

The combination of 1.25 parts of tributyltin-S-isooctyl mercaptoacetate and 0.75 part of monobutyltin tris(lauryl mercaptide) in polyvinyl chloride first exhibits a rating of 2 following 45 minutes of heating. The sample containing 2 parts of the monobutyltin compound and no auxiliary stabilizer exhibited a rating of 2 after only 15 minutes of heating. This improvement in heat stability is not observed when the monoorganotin compound is replaced with the corresponding diorganotin derivative, in which instance the heat stability imparted by the mixture is less than observed using the diorganotin compound alone, but superior to that attained by the triorganotin compound. This exemplifies the simple additive affect which one would expect from a combination of prior art stabilizers.

The data in Table III demonstrates that the unexpectedly large improvement in heat stability that characterizes the present two-component stabilizers is obtained at lower concentrations of stabilizer. The samples were milled for 5 minutes at a temperature of 190°C. and tested for heat stability in an oven maintained at a temperature of 190°C.

TABLE III

| Sample No. | Stabilizer (Parts) | Gardner Color After X Minutes of Heating (initial color) | | | | | | |
|---|---|---|---|---|---|---|---|---|
| | | X=0 | 5 | 10 | 15 | 20 | 25 | 30 |
| 1 | BuSn(IOMA)$_3$ (0.5) | 0 | 0 | 0 | 0 | 1 | 2 | 5 |
| 2 | Bu$_3$SnIOMA (0.5) | 7 | 7 | 8 | 10 | 12 | 16 | 18 |
| 3 | BuSn(IOMA)$_3$ (0.3) Bu$_3$SnIOMA (0.2) | 0 | 0 | 0 | 0 | 0 | 1 | 4 |
| 4 | BuSn(IOMA)$_3$ (0.25) BuSn(IOMA$_3$ (0.2) | 0 | 0 | 0 | 0 | 1 | 11 | 18 |
| 5 | Bu$_3$SnIOMA (0.3) | 0 | 0 | 0 | 0 | 1 | 3 | 5 |

Bu = n—C$_4$H$_9$—
IOMA = —SCH$_2$COO—iso—C$_8$H$_{17}$

For purposes of comparison, the heat test data for a polymer sample containing 0.25 part of the monobutyl stabilizer is presented to demonstrate the significant color degradation that occurs during the interval between 20 and 25 minutes of heating. For the sample containing 0.2 part of this stabilizer and 0.3 part of the tributyltin compound the color rating following 25 minutes of heating should be between 11 (the rating for 0.25 part of the monobutyltin compound) and 16 (the rating for 0.5 part of the triorganotin compound), yet the actual rating is 3, which is only one degree less than the rating for a sample containing 0.5 part of the superior monobutyltin compound. This same effect is observed at all of the other evaluation times, however it is most apparent in the long-term heat stability of the samples.

Samples containing a total of three parts per 100 parts of resin of butyltin-S,S',S''-tris(isooctyl mercaptoacetate), the corresponding tributyltin compound or mixtures thereof were tested. The results of this evaluation are recorded in Table IV.

TABLE IV

| Sample No. | Stabilizer (Parts) | Gardner Color After X Minutes of Heating | | | | | | |
|---|---|---|---|---|---|---|---|---|
| | | X=0 | 5 | 10 | 15 | 20 | 25 | 30 |
| 1 | BuSn(IOMA)$_3$ (3.0) | 0 | 0 | 0 | 1 | 3 | 5 | 6 |
| 2 | Bu$_3$SnIOMA (3.0) | 0 | 1 | 1 | 5 | 10 | 11 | 13 |
| 3 | BuSn(IOMA)$_3$ (2.25) Bu$_3$SnIOMA (0.75) | 0 | 0 | 0 | 0 | 2 | 3 | 4 |
| 4 | BuSn(IOMA)$_3$ (1.0) Bu$_3$SnIOMA (2.0) | 0 | 0 | 0 | 0 | 1 | 2 | 3 |

The foregoing samples were milled at 163°C. and tested for heat stability in a circulating air oven maintained at a temperature of 205°C.

As in the preceeding examples, it is evident from the data that the monobutyltin compound imparts significantly better long term heat stability per given weight than the corresponding tributyltin derivative. Yet when 25% of the monoorganotin compound is replaced by an equal weight of the less efficacious triorganotin compound the heat stability is actually slightly improved relative to a sample containing the same concentration (3.0 parts) of the monobutyltin compound. While it may be argued that the improvement is relatively slight (one unit following 20 minutes and 2 units following 25 and 30 minutes), even more of an improvement in heat stability is observed as the relative concentration of the less efficacious triorganotin compound is increased from 25 to 66%. This is directly contrary to what is expected from an increase in the concentration of the less efficacious stabilizer, and cannot be considered to result from an additive effect of two known stabilizers.

Although this invention has been illustrated by reference to specific examples, changes therein which clearly fall within the scope of the invention will be apparent to those skilled in the art. It is, therefore, to be limited solely by the scope of the appended claims.

What is claimed is:

1. A halogen-containing polymer composition stabilized against the deteriorative effect of heat comprising a halogen-containing resin selected from the group consisting of homopolymers of vinyl chloride and vinylidene chloride and copolymers of vinyl chloride and vinylidene chloride with other ethylenically unsaturated monomers and effective amounts of (1) a primary stabilizer selected from the group consisting of monobutyltin-S,S',S''-tris-(iso-octyl mercaptoacetate), and butyltin tris-(lauryl mercaptide) and (2) an auxiliary stabilizer selected from the group consisting of tributyltin-S-iso-octyl mercaptoacetate, triphenyltin lauryl mercaptide, and triphenyltin thiophenate; with the proviso that the weight ratio of primary stabilizer to auxiliary stabilizer is between about 1:2 and 7:1.

2. A halogen-containing polymer composition as described in claim 1 wherein the pair of primary and auxiliary stabilizers is selected from the group consisting of butyltin-S,S',S''-tris(isooctyl mercaptoacetate) and triphenyltin lauryl mercaptide; butyltin-S,S',S''-tris(isooctyl mercaptoacetate) and triphenyltin thiophenate; butyltin-S,S',S''-tris(isooctyl mercaptoacetate) and tributyltin-S-isooctyl mercaptoacetate; and butyltin tris(lauryl mercaptide) and tributyltin-S-isooctyl mercaptoacetate.

3. The novel stabilized halogen-containing polymer composition of claim 1 wherein said primary stabilizer is present in amounts between about 0.2 and 1.8 parts by weight per 100 parts of halogen-containing polymer and said auxiliary stabilizer is present in amounts between about 0.2 and 1.8 parts per 100 parts of halogen-containing polymer.

4. A novel stabilizer composition comprising a primary stabilizer selected from the group consisting of monobutyltin-S,S',S''-tris-(iso-octyl mercaptoacetate), butyltin tris-(lauryl mercaptide) and an auxiliary stabilizer selected from the group consisting of tributyltin-S-iso-octyl mercaptoacetate, triphenyltin lauryl mercaptide, and triphenyltin thiophenate, with the proviso that the weight ratio of said primary stabilizer to said auxiliary stabilizer is between about 1:2 and 7:1.

5. A novel stabilizer composition as described in claim 4 wherein the pair of primary and auxiliary stabilizers is selected from the group consisting of butyltin-S,S',S''-tris(isooctyl mercaptoacetate) and triphenyltin lauryl mercaptide; butyltin-S,S',S''-tris(isooctyl mercaptoacetate) and triphenyltin thiophenate; butyltin-S,S',S''-tris(isooctyl mercaptoacetate) and tributyltin-S-isooctyl mercaptoacetate; and butyltin tris(lauryl mercaptide) and tributyltin-S-isooctyl mercaptoacetate.

* * * * *